Sept. 25, 1962

R. E. PETERSON 3,055,972

FLUID LEAKAGE SEAL FOR ELECTRIC CABLES

Filed July 3, 1958

INVENTOR.
ROBERT E. PETERSON
BY
Lee J. Hurtzluger
ATTORNEYS:

Sept. 25, 1962   R. E. PETERSON   3,055,972
FLUID LEAKAGE SEAL FOR ELECTRIC CABLES
Filed July 3, 1958

INVENTOR:
ROBERT E. PETERSON
BY
ATTORNEYS:

Sept. 25, 1962

R. E. PETERSON

3,055,972

FLUID LEAKAGE SEAL FOR ELECTRIC CABLES

Filed July 3, 1958

INVENTOR.
ROBERT E. PETERSON

BY

*Lee J. Hunsperger*
ATTORNEYS

Fig. 15.

United States Patent Office 3,055,972
Patented Sept. 25, 1962

3,055,972
FLUID LEAKAGE SEAL FOR ELECTRIC CABLES
Robert E. Peterson, Homestead Circle, Old Lyme, Conn.
Filed July 3, 1958, Ser. No. 746,575
9 Claims. (Cl. 174—151)
(Granted under Title 35, U.S. Code (1952), sec. 266)

The invention described herein may be manufactured and used by or for the Government of the United States of America for governmental purposes without the payment of any royalties thereon or therefor.

This invention relates to packing constructions for use in sealing an electric cable in a casing into or through which it passes or in which it terminates in a manner to prevent fluid leakage along the cable. It has particular utility in sealing an electric cable against leakage along it where the cable passes through a wall with differences in fluid pressure on opposite sides thereof, and also utility in sealing an electric cable against moisture leakage where the cable enters or leaves a closed housing or casing. In seagoing vessels it is often necessary to have, for various reasons, electric cables passing through a wall in the vessel to connect apparatus outside of the vessel and in the water with apparatus within the vessel in a relatively dry environment, or where there is a fluid pressure differential on opposite sides of such wall. In making splices in underwater cables or cables exposed to moisture, it is very desirable to prevent moisture from reaching the actual splices.

Various attempts have heretofore been made to seal or pack electric cables to prevent movement of water or other fluid therealong, especially where the cable passes through a pressure hull or into a casing, but they have not been entirely satisfactory, especially where the packing or sealing is subject to temperature variations and/or where the packing or sealing means is not conveniently accessible for frequent inspection and adjustment.

This application is a continuation-in-part of my co-pending application, Serial No. 546,291, filed November 10, 1955, now Patent 2,936,187.

An object of this invention is to provide an improved packing and sealing construction for electric cables where they pass into or out of a casing, or both, where fluid pressure may vary inside and out of the casing, or where the cables pass through a sea pressure hull or wall with different fluid pressures on opposite sides of the wall, or where the packing or sealing construction may be subject to substantial variations in temperature, which when adjusted and assembled will effect a fluid tight engagement with a housing or casing and a cable periphery, and prevent leakage or movement of moisture along the cable, which will automatically maintain an effective fluid tight sealing engagement without attention or manual adjustment over relatively long periods of time, particularly where the sealing and packing construction may be subjected to variations in fluid pressures and temperatures, which will not require installation or adjustment by highly skilled artisans, and which will be relatively simple, compact, practical, effective and inexpensive in construction.

Another object is to provide a fluid impervious seal around an electric cable as it passes through a wall on opposite sides of which wall there may be differences in pressure, temperature or fluid conditions, and which differences may be subject to substantial variations in use of the cable, with which in the event of an emergency or accident, the cable may be severed and the passage in the wall around the cable sealed, or if the cable has been forcibly removed from the wall the seal may be adjusted to close the passage from which the cable had been removed.

Other objects and advantages will be apparent from the following description of a number of embodiments of the invention, and the novel features will be particularly pointed out in connection with the appended claims.

Figure 1:
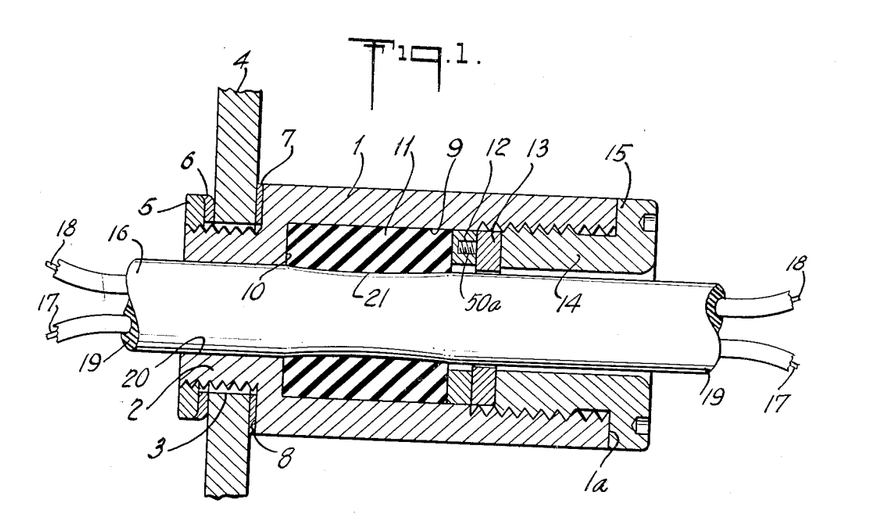
FIG. 1 is a sectional elevation of one construction embodying the invention, where an electric cable passes through the vessel hull or a bulkhead.

In the embodiment of the invention illustrated in FIG. 1, the packing device includes a tubular member or casing 1 having an end 2 reduced in diameter and externally threaded. This reduced end passes snugly through an aperture 3 in the wall 4 of the hull of a vessel, or of a bulkhead, and upon the reduced end which extends through the wall 4, a nut 5 is threaded. A lock washer 6 is confined on the reduced end 2 between the lock nut 5 and the wall 4. A gasket 7, such as an O-ring or a gasket of the type used on spark plugs, for example, is confined on the reduced end 2, on the inside face of the wall 4 so as to be confined between the inside face of the hull or wall 4 and a shoulder 8 which is provided at the junction of the main part of the tubular member 1 with the reduced end 2. The member or casing 1 has a counterbore 9 extending from its inside end to provide within the counterbore 9 a shoulder 10 that faces the inner open end of the casing 1. Within the counterbore 9 and abutting against the shoulder or abutment 10 is a grommet or sleeve-like bushing 11 of elastic, substantially incompressible material which is deformable under pressure, such as the natural rubbers in elastic form, or any of the so-called synthetic rubbers or synthetic elastic compounds having the physical characteristics of live elastic natural rubber, such as polychloroprene.

Also located within the counterbore 9 and abutting against the outer end base of grommet 11 is a flat washer or relatively rigid annular ring 12. A washer 13 or interponent, which is resilient because of its shape or material, such as a split or spring washer, or a coil spring, is disposed against the ring 12 and confines it against the outer end face of the grommet 11. A sleeve or stuffing gland 14 is threaded into the outer end of the counterbore 9, and its inner end abuts against the outer end face of the resilient washer 13. The outer end of the sleeve or gland 14 is provided with an external, peripheral flange 15 which preferably seats against the outer end face 1a of the tubular member or casing 1. An electric cable 16 having therein a plurality of insulated conductors 17 and 18 surrounded by a sheath of insulation 19 passes approximately snugly through the passage 20 in the reduced end 2 of the tubular member or casing 1, and also through the grommet 11 the passage of which approximately fits the periphery of the cable 16. The ring 12 and washer 13 surround the cable 16 with very slight clearance therewith, and the sleeve or gland 14 also has a very slight clearance with the periphery of the cable 16. The periphery of the cable 16 is not accurately cylindrical but approximately so, and the insulation 19 in which the conductors 17 and 18 are molded or confined is somewhat yielding and not absolutely rigid and nondeformable.

The length of the stuffing gland 14 in this example of the invention is determined and selected, so that when the gland or sleeve 14 is threaded into the tubular member or casing 1 until the flange 15 seats against the outer end of face 1a of casing 1, the split or resilient washer 13 will be pressed in an endwise direction, and through the rigid ring or washer 12 will press the grommet 11 endwise against the shoulder 10, so as to deform the grommet laterally of its length into tight sealing contact with the peripheral wall of the counterbore 9 and with the periphery of the cable 16. Since the cable 16 has a surface which can be slightly depressed, the grommet 11 may and usually will indent itself slightly into the periphery of the cable such as shown by the line 21, which serves the double purpose of firmly anchoring the cable 16 against endwise movement through the casing or member 1, and in conforming to any irregularities in the periphery of the cable.

It was found in practice that without a resilient washer 13, changes in temperature to which the packing or sealing device was subject to in use, occasionally resulted in leakage along the surface of the cable, especially where there is a large pressure differential at the ends of the passage through the member or casing 1. By having the resilient washer 13 under substantial compression, even after the grommet 11 has been pressed endwise and deformed into sealing contact with the inner periphery of the counterbore 9 and with the periphery of the cable 16, the grommet will be held under adequate sealing contact and pressure at all times throughout variations in temperature, and will maintain this tight sealing over long periods of time without adjustment or special attention.

Such an arrangement is particularly useful where electric cables pass through the hull of a submarine in the part which may be sometimes above water and subject to the temperature of the air and also at times below the water and subject to the temperature of the water surrounding the submarine. The air just above the sea seldom if ever has exactly the temperature of the sea, and therefore, as the submarine submerges or surfaces, the sealing around a cable will be subjected to substantial changes of temperature. This new type of sealing device has been found to be remarkably free of leakage under various changes of temperature and pressure, and will stand up for long periods of time without adjustment or attention.

By selecting the proper length of the gland or bushing 14, it will, when screwed into the counterbore until its flange 15 seats against the end face 1a, cause the necessary deformation of the grommet 11 to effect a satisfactory seal. Thus, any person skilled or unskilled, can set the sealing device to give the necessary pressure by merely tightening the gland 14 until its periphery seats against the end face 16 of the member 1.

Figure 1A:
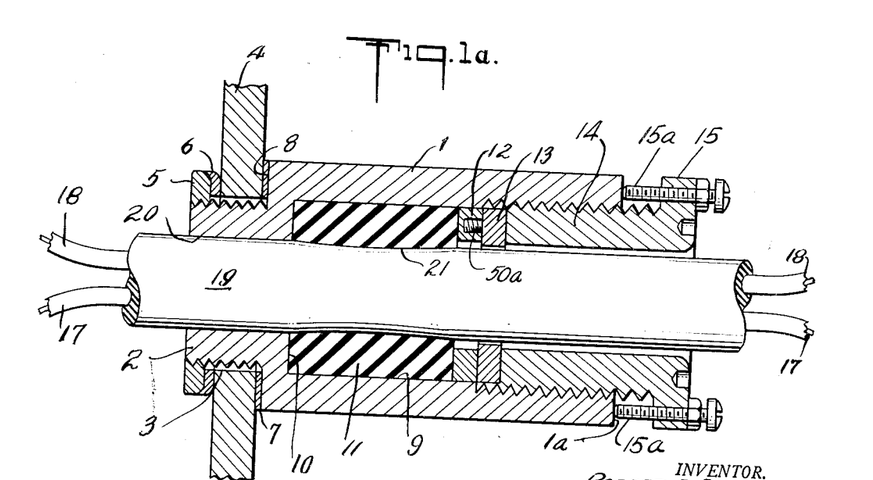
FIG. 1a is similar to FIG. 1 but shows a modification of part of the same.

In FIG. 1a, the gland 14 has been made of such a length that its peripheral flange 15 does not seat against the end of the member 1 when the grommet has been adequately deformed into a tight seal, and in such a case the flange 15 of the adjustable gland 14 carries one or more stop screws 15a threaded therethrough in a direction parallel to the cable length so as to abut endwise against the end face 16 of member 1 and serve as an adjustable stop to limit the compression of the grommet in the same manner as if the flange had seated against the end face of the casing.

Figure 2:
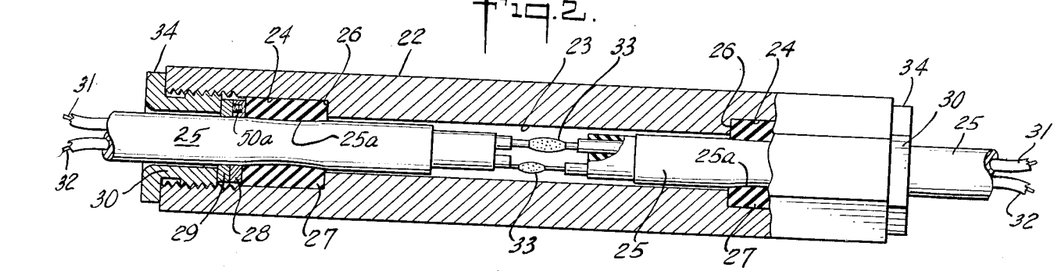
FIG. 2 is an elevation, partly in section of another embodiment of the invention, where the seal or packing is applied to a casing into and out of which an electric cable extends to protect a splicing of the cable against moisture.

In the embodiment of the invention illustrated in FIG. 2, the principle of this invention is applied to a splicing device for an electric cable where the splice may be exposed to moisture. It includes a cylindrical tubular member 22 of hexagonal periphery having a passage 23 therethrough from end to end, and the outer ends of the member 22 are counterbored to provide a larger diameter passage 24 for some distance from each end. Similar seating means is provided at each end of member 22 to engage the section or end of an electric cable 25 which passes into the member 22 to be joined or spliced to another cable section or end. Corresponding parts in the sealing means at each end of member 22 will be identified by corresponding reference numerals. Each counterbore 24 provides a shoulder 26 which faces outwardly, and in the counterbore and abutting the shoulder 26 at each end of the member 22 is an elastic, substantially incompressible but deformable grommet 27 which corresponds to the grommet 11 of FIG. 1.

A rigid annular ring 28 abuts the outer end of each grommet 27, and a resilient washer or interponent 29 abuts against the outer face of the ring 28 in each counterbore 24. A sleeve or stuffing gland 30 is threaded into the outer end of each counterbore 24 so that its inner end will, when the gland is adjusted or threaded into the counterbore, compress or deform the washer 29 and through the ring 28, it will press the grommet 27 endwise against the shoulder 26. This will deform the grommet sidewise into sealing contact with the wall of the counterbore and with the periphery of the electric cable 25 which passes into or through the casing of member 22. Each grommet, when so deformed against the cable 25, will not only conform its passage to the periphery of the cable, but will indent itself somewhat into the periphery of the cable as shown at 25a, in the manner explained in connection with FIG. 1.

In a part of the passage 23 between the counterbored ends, the conductors 31 and 32 may have splices 33 therein, and those splices will be protected by the grommets from moisture or water attempting to pass along the cable 25 into casing 22. The glands 30 are adjusted until the necessary deformation of the grommets is produced to give the desired seal, and this adjustment may, when desired, be determined by engagement with the outer end face of member 22 of the peripheral external flange 34 of each gland 30. The flange 34 is a medium by which the gland may be rotated in order to thread it into and out of counterbore in which it is received. This peripheral flange may, if desired, be spaced from the end face of the casing or member 22 so as to provide for further movement if necessary, as shown in FIG. 1a, in order to increase the pressure on the resilient washer 29. Preferably, the length of each gland 30 or of each grommet 27 is preselected so that when one adjusts the gland or sleeve 30 into the counterbore until the peripheral flange 34 seats against the outer end face of the member or casing 22, the desired seal on the cable is obtained. This eliminates the need of skill in effecting a seal on the cable.

Figure 3:
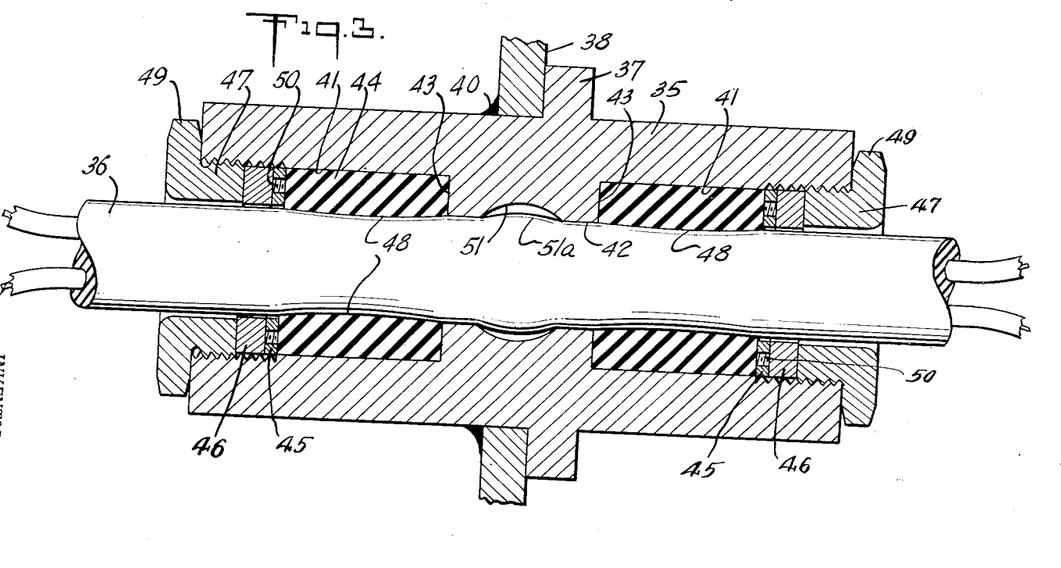
FIG. 3 is a sectional plan of another embodiment of the invention, where the electric cable passes through the hull or bulkhead of a vessel, and with a double sealing between the cable and the casing secured in the vessel wall through which the cable extends.

Referring next to FIG. 3, the sealing means is applied at both ends of a casing or tubular member 35 so as to provide a double seal that prevents leakage along the electric cable 36. The member 35 has a peripheral flange 37 which seats against a face of the wall 38 of the vessel or bulkhead, with the body of the member 35 passing through an aperture 39 in the wall or bulkhead 38. Welding 40 connects the member 35 with the wall 38 at the side thereof opposite from the flange 37, so that the member 35 is permanently and firmly anchored in the aperture 39 of the vessel hull or bulkhead wall. The member 35 is provided with a counterbore 41 at each end, but the counterbores do not meet, so as to leave a passage length 42 intermediate between the two counterbored ends. This provides a shoulder 43 or abutment in each counterbore which faces the outer end of its counterbore. Confined in each counterbore 41 is an elastic and substantially incompressible but deformable grommet 44, similar to grommet 11 of FIG. 1, which fits its counterbore 41 and abuts against a related shoulder 43.

A rigid ring or flat washer 45 abuts against the outer end face of each grommet 44, and a resilient washer or interponent 46 is also provided in the bore to abut face to face with the outer face of the ring 45. A sleeve or gland 47 is threaded into the outer end of each counterbore so as to engage with and stress the adjacent washer 46 and thereby it will press the related grommet 44 endwise against the related shoulder 43 sufficiently to distort or deform the grommet sidewise into sealing engagement with the counterbore wall and with the periphery of the electric cable 36. As explained in connection with FIG. 1, the grommet will indent itself slightly into the periphery of the electric cable 36, as shown by the lines 48 in FIG. 3.

Each gland is provided with an external peripheral flange 49 which, if desired, may seat directly against the adjacent end face of the member 35 when just the right amount of sealing pressure is exerted on the grommet 44 as shown in FIG. 3, or the peripheral flange may still be spaced from the adjacent end face of the member 35 to enable further adjustment. In this embodiment of the invention, each flat ring 45 is bonded to the adjacent end face of a grommet 44, so that when the ring 45 is removed, the grommet 44 will be removed with it. For this purpose, the ring 45 is provided with one or more threaded apertures 50, and after the sleeve or gland 47 has been backed out of the counterbore and the split washer 46 removed, one can thread rods (not shown) into the threaded apertures 50, and then by pulling outwardly on these rods, one may remove the rings 45 and with them the grommets 44. This makes it possible to easily remove the grommets for inspection or replacement.

In the passage 42, between the shoulders 43, an annular shallow groove, recess, depression or cavity 51 which opens into the passage 42 may be provided. If either end of the cable 36 should be pushed endwise towards a grommet 44, the insulation of the cable will tend to expand outwardly and into the groove 51, and thus form a peripheral lug 51a around the cable which, by its engagement in the annular groove 51, will effectively resist substantial endwise movement of the cable through the member 35 until the glands 47 and grommets 44 have been removed. It will be noted that this construction provides a double seal and also provides resistance to endwise pushing of the cable along the passage through the member 35.

Figure 4:
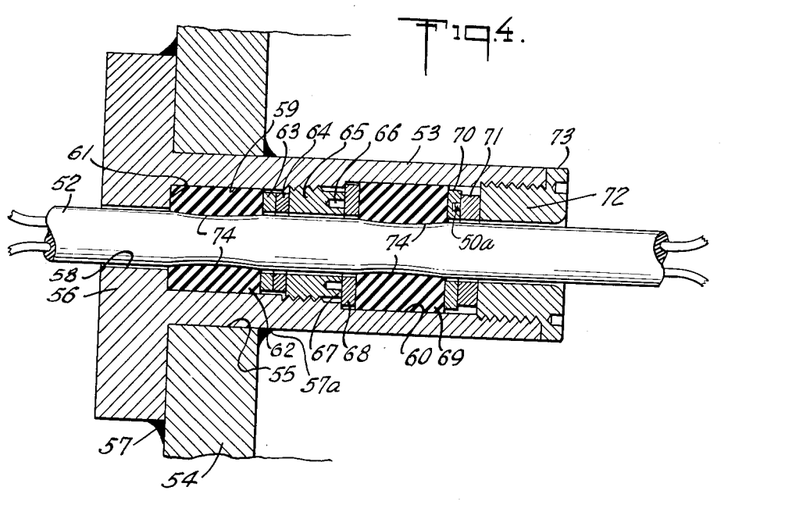
FIG. 4 is a sectional elevation of still another embodiment of the invention in which two sealing and packing constructions embodying the invention are arranged in tandem to provide a double seal, with access to both seals at one side of the hull only.

Referring next to FIG. 4, the improved seal for the electric cable 52 is provided with a double seal in tandem for double security against leakage, but with all the sealing means provided and accessible at one end of the tubular member or casing 53, instead of at opposite ends as shown in FIG. 3. For this purpose, the hull or bulkhead wall 54 is provided with a passage or aperture 55 from face to face thereof, through which the member or casing 53 passes, and the outer end of the member 53 is provided with a peripheral flange 56 which abuts against the outer face of the hull wall 54 where it is exposed to the pressure of the sea. Flange 56 may be welded as at 57 to the outer face of the wall 54, and the casing at the inside face of wall 54 also welded to wall 54 at 57a, so as to obtain a water-tight permanent connection between member 53 and the hull wall 54. The member 53 has a passage 58 from end to end therethrough, and this passage is provided with one counterbore 59 from the inner end of casing or member 53, and also with a larger counterbore 60 nearer the inner end of the member 53.

The counterbore 59 provides a shoulder 61 which may be approximately aligned with the outer face of the hull wall 54, and an elastic, substantially incompressible but deformable grommet 62 similar to grommet 11 of FIG. 1, is disposed so as to abut against the shoulder 61. A flat washer or ring 63 abuts against the face of the grommet 62 at the end thereof opposite from shoulder 61. A resilient washer 64 is disposed in the counterbore 59 so as to abut against the exposed face of the ring 63. A seal or gland 65 without a peripheral flange is threaded into the counterbore 59 to abut endwise against the spring washer 64 and by screwing the gland 65 towards the shoulder 61, it will put the washer 64 under pressure and, as explained in connection with FIG. 1, this will cause the grommet 62 to be deformed or expanded sidewise into sealing engagement with the wall of the counterbore 59 and with the periphery of the cable 52 where the cable passes through the grommet. The exposed or outer end face of the gland 65 is provided with a plurality of recesses 66, by which a tool or spanner wrench may be applied to the gland or sleeve 65 to turn it in either direction, depending on whether the grommet is to be expanded or released.

As explained above, counterbore 60 is larger in diameter than the counterbore 59, which provides a shoulder 67, and this shoulder is cleared and passed by the sleeve or gland 65 when it is adjusted into grommet expanding position. A flat ring 68 is provided at the inner end of the counterbore 60, to abut against the shoulder 67, and an elastic, substantially incompressible but deformable grommet 69 is disposed in the counterbore 60 so as to abut against the ring or washer 68. Another flat rigid ring 70 is provided in counterbore 60 so as to abut against the end face of the grommet 69 at the end thereof opposite from the shoulder 67. A resilient washer 71 abuts against the ring 70, and the ring 70 and washer 71 are freely movable along the counterbore. A second stuffing gland or sleeve 72 is threaded into the outer end of the counterbore 60, and at its inner end it presses the washer 71 and through it and the ring 70 it presses the grommet 69 against the ring 68 that serves as an abutment engaging the shoulder 67 at the inner end face of the grommet. By tightening the gland 72, the grommet 69 may be pressed against plate or ring 68 and expanded sidewise into sealing engagement with the wall of the counterbore 60 and also the periphery of the electric cable 52 that passes through the glands 65 and 72, the washers, rigid rings and grommets.

The gland 72 may have an external peripheral flange 73 which may, when desired, as shown in FIG. 4, seat against the end face of the member 53 when the grommet 69 is under the desired expansion or deformation. It will be observed that with this construction the double seals provided for the electric cable are arranged in tandem within the vessel, so that both are accessible for inspection and to take them apart or adjust entirely from within the vessel. It will also be noted that each of the grommets 62 and 69 can be adjusted independently of one another into contact with the periphery of the cable 52, and these grommets when expanded may also indent themselves slightly into the periphery of the cable, as shown by the lines 74. Instead of the recesses 66 in the exposed end of the gland 65, the outer end of this gland may be provided with diametrically disposed, radially extending slots into which lugs of a spanner wrench may be inserted in order that the gland may be turned in either direction.

Figure 5:
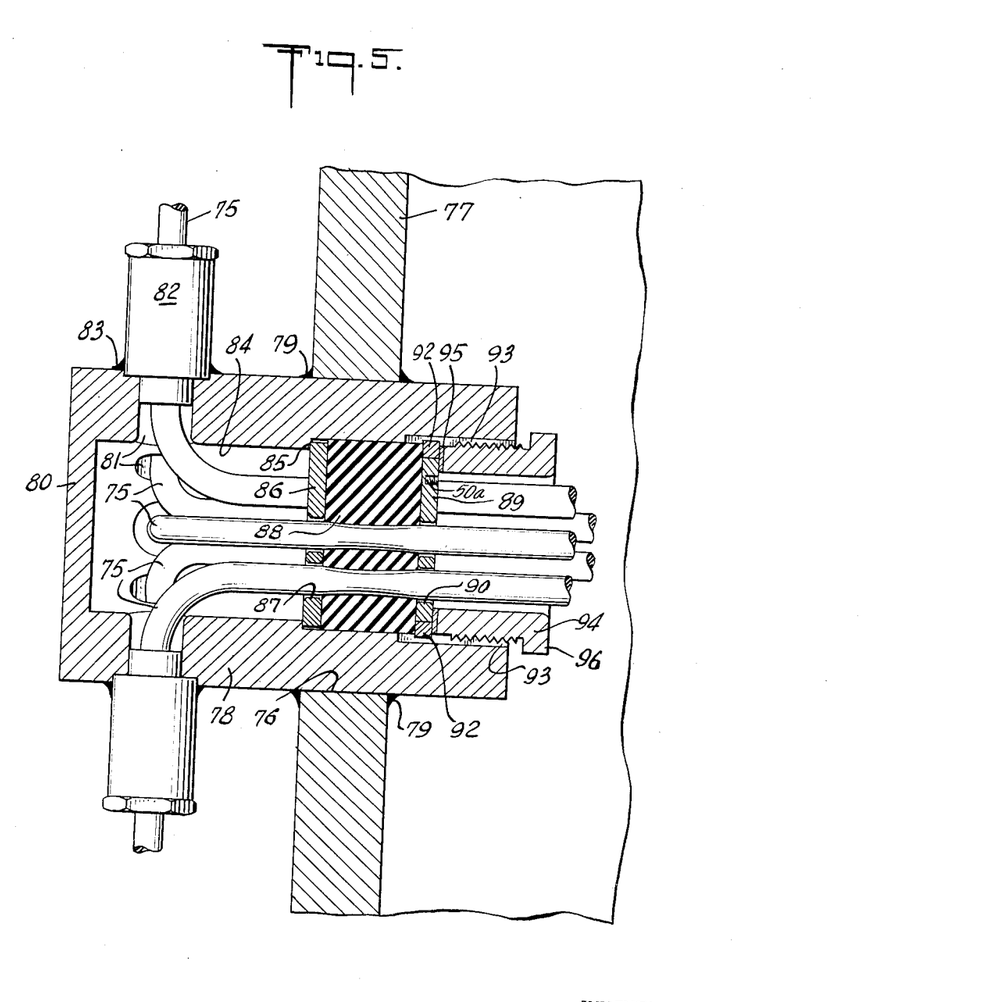
FIG. 5 is a sectional elevation of a further embodiment of the invention that may be employed when a plurality of separate electric cables pass through a wall or vessel hull.

In the embodiment of the invention illustrated in FIG. 5, a packing or sealing arrangement is provided for a plurality of electric cables 75 which pass through the same aperture 76 in the wall 77 of a vessel hull or bulkhead. A hollow member or casing 78 extends snugly through the aperture 76 in the wall 77, so as to extend both inwardly and outwardly of the wall 77. Intermediate of its ends, the casing 78 is secured by welding 79 to opposite faces of the wall 77 at the aperture 76. The casing 78, at its outer end which is exposed to the sea water has an impervious end wall 80. Its periphery on the the outside of the hull is provided with a plurality of radially extending passages 81 through each of which an electric cable 75 may pass into the interior of the casing 78. Sealing devices 82, similar to the sealing devices shown in FIG. 1 are secured in the passages 81, and the casings of these sealing devices 82 are welded as at 83 to the peripheral wall of the casing 78 exteriorly of the hull.

Figure 8:
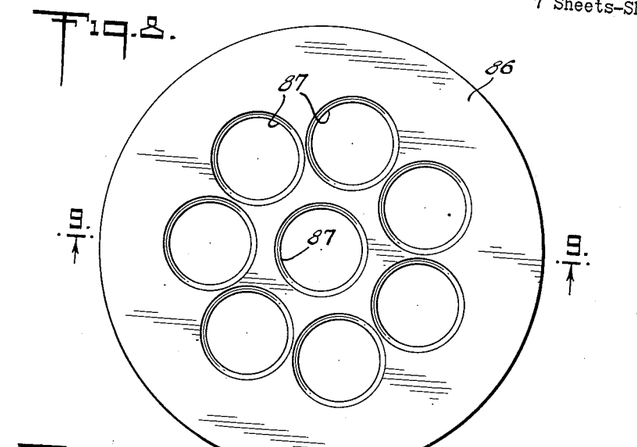
FIG. 8 is a plan of an apertured plate employed in the embodiment illustrated in FIG. 5.
Figure 9:
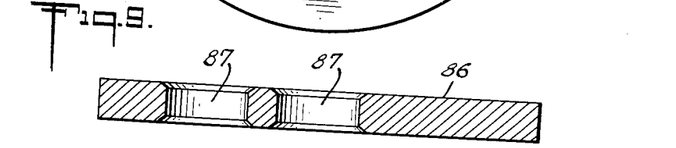
FIG. 9 is a sectional elevation of the same, the section being taken approximately along the line 9—9 of FIG. 8.
Figure 10:
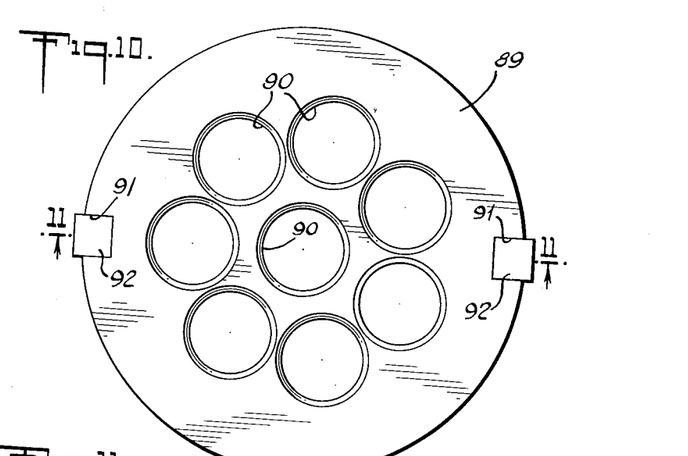
FIG. 10 is a plan of a rigid disc or member that is employed as a part of the construction shown in FIG. 5.
Figure 11:
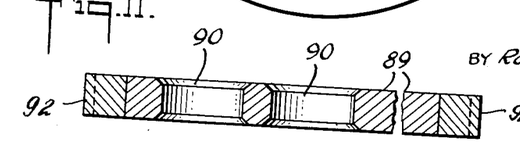
FIG. 11 is a sectional elevation of the same, the section being taken approximately along the line 11—11 of FIG. 10.

The casing 78 is provided with an interior chamber 84 which has an open end within the hull, and intermediate of its ends this chamber 84 has a shoulder 85 which faces the inner open end of the casing 78 and serves as an abutment for positioning a rigid plate 86 across the chamber 84. The plate 86 is shown separately in FIGS. 8 and 9, and has a plurality of apertures 87 from face to face therethrough and through which cables 75 may pass, one through each aperture 77. Disposed within the chamber 84, at the end thereof toward the open end of the casing 84 and abutting against plate 86 is an elastic, substantially incompressible but deformable grommet 88. Abutting against the exposed end of the grommet 88 is another rigid plate 89, shown separately in FIGS. 10 and 11, which has a plurality of apertures 90 therethrough from face to face, through which the cables 75 may pass.

In order to prevent rotation of the plate 89 in the chamber 84, the periphery of the plate 89 is provided with notches 91 (FIG. 10) at diametrically opposite sides, and a key 92 is provided in each of these notches 91 so as to extend outwardly of the periphery of the disc or plate 89. The chamber 84, from its open end inwardly to a distance somewhat beyond the plate 89, is provided with guideways or slots 93 in which the keys 91 slide, so that the plate 89 may be moved endwise along the chamber 84 from the open end, but the keys resist turning of the plate 89 in the chamber 84. A tubular gland or sleeve 94 is threaded into the open end of the chamber 84 within the vessel, and between its inner end and the plate 89 a resilient washer 95 is disposed. By adjusting the gland 94 inwardly it will press the washer 95 and through it press the grommet 88 endwise against the plate 86. This expands the grommet into sealing engagement with the wall of the chamber 84 and also into sealing engagement with the various cables which pass through the grommet.

Figure 6:
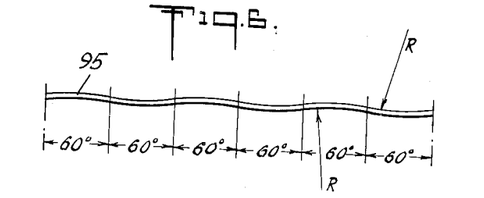
FIG. 6 is a side elevation of a type of spring washer which may be employed in accordance with this invention.
Figure 7:
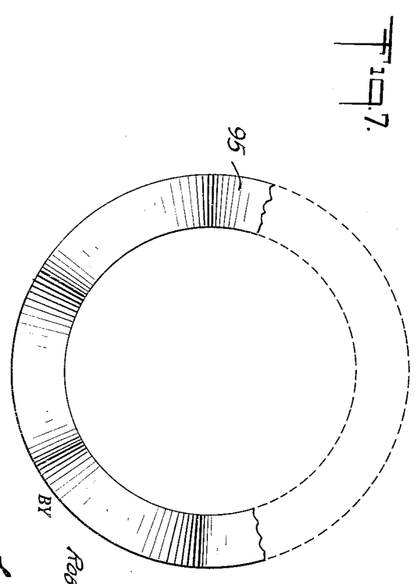
FIG. 7 is a plan of part of the same.

The gland 94 has an external peripheral flange 96 by which the gland may be turned and threaded into chamber 84, and if desired, the length of the gland 94 may be so selected that the grommet will be sealed by expansion against the cables and the wall of the chamber 84, with the washer 95 fully compressed, when the flange 95 engages against the end face of the casing 78 within the hull. However, the flange 96 may have an adjustable stop to engage with the end face of casing 78, as shown in FIG. 1a, or the flange 96 may be spaced from the end of member 78 to provide for future tightening. It is noted that there is a double seal on each cable, one of which is in the housing 82 which is individual to each cable, and all of the cables are again sealed when they pass through the grommet 88. The resilient washer 95 may be an annular ring with its faces undulating as shown in FIGS. 6 and 7, so that when the washer is compressed in a direction from face to face thereof, it will exert a continuous resilient force on the plate 89 and on the grommet 88. This same type of resilient washer may be used as the resilient washer in the other examples of the invention.

Figure 12:
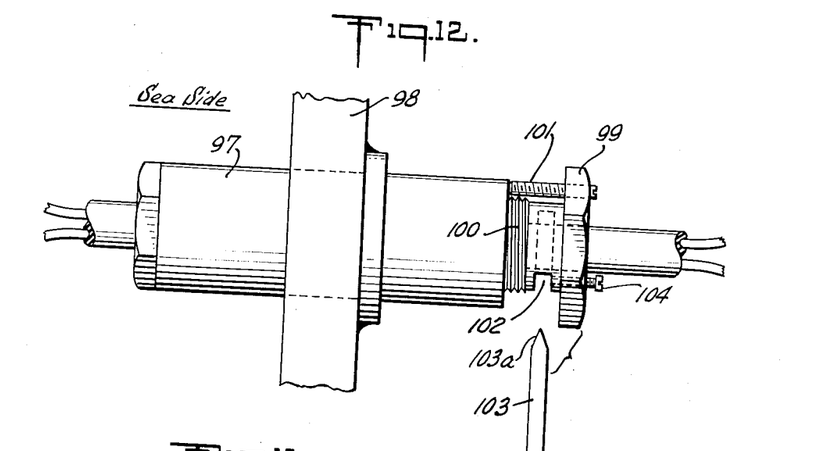
FIG. 12 is side elevation of another example of the invention, where in an emergency the cable can quickly and easily be severed and the cable passage sealed.
Figure 13:
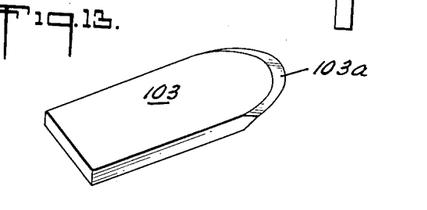
FIG. 13 is a perspective of the knife or wedge used in the embodiment shown in FIG. 12.

In the embodiment shown in FIGS. 12 and 13, the sealing construction is the same as shown in FIG. 3, with a sealing arrangement at each end of the tubular casing or member 97 that passes through and is welded in an aperture in the hull wall 98, except that at the end within the hull, the flange 99 of the gland 100 has a stop screw 101 threaded through it to engage with the inner end face of the member 97 and thus limit inward adjustment of that inner gland 100, and also has a slot 102 in an unthreaded portion in front of the flanged end extending across the passage of the gland, and of a width at least as large as the diameter of the passage in the gland 100. A hardened steel chisel or knife 103, having a knife edge 103a, shown separately in FIGS. 12 and 13 has a width enabling it to fit and slide in the slot 102. If an emergency arises, such as due to a complete failure of the sealing means, the knife or chisel 103 may be inserted into the slot 102 and driven inwardly to sever the cable and shut off and seal completely the passage through the gland 100. A lock screw 104 also threaded through the flange 99 in alignment with the slot 102, may then be threaded into engagement with the knife or chisel 103 to hold it in sealing position.

Figure 14:
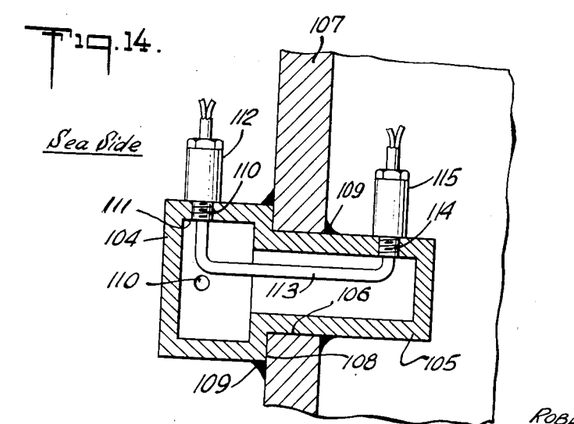
FIG. 14 is a sectional plan of a seal also embodying the invention but illustrating a modification of FIG. 5.

A modification of the construction shown in FIGS. 5–11, is illustrated in FIG. 14. In this modification, a hollow, closed casing or box 104 has a reduced end 105 which extends snugly through an opening 106 in the wall 107 of a hull or bulkhead until the shoulder face 108, where the reduced end 105 joins the larger end, engages a face of the wall 107. Welding 109 secures the box 104 in position in wall 107. On the larger, outer end, the side wall is provided with one or more threaded apertures 110 into each of which is threaded the reduced end 111 of a casing 112. The casing 112 has a sealing construction such as shown in FIGS. 1 or 1a for a cable 113 that passes through it into the chamber of the box 104. The side wall of the reduced end 105 within the hull or ship is similarly provided with an equal number of apertures 114 into which the reduced ends of cable sealing casings 115, similar to casings 112, are threaded. Each cable 113 passes from the chamber of box 104 through the sealing casing 115. The two sealing casings 112 and 115 for each cable provide a double seal where each cable 113 passes through the wall 107.

By using the stop screw as shown in FIG. 1a in any of the various embodiments, if an accident should occur in which the cable has been forcibly pulled completely through the hull tube, one may, by backing up or removing the stop screw 15a, then advance the sleeve or gland until it further presses the grommet and causes the latter to close up on itself and block the flow of fluid through the hull. The grommet may, if desired, be split lengthwise at one side, so that for long cables, or cables where it is inconvenient or impossible to slip the grommet endwise over the cable, one may merely spring the grommet open and pass it over the cable, and its resiliency will cause it to assume its normal cable encircling condition on the cable. The bonding of each grommet to the flat washer on its outer end face with tapped holes in the washer as shown in FIG. 3, is also useful in all embodiments of the invention. The improved means herein disclosed is useful to seal the entrance of an electric cable into any closed casing or housing, including those in which the cable terminates within the casing or housing, such as the entrance of a cable into a housing containing a hydrophone or other electrical device.

Figure 15:
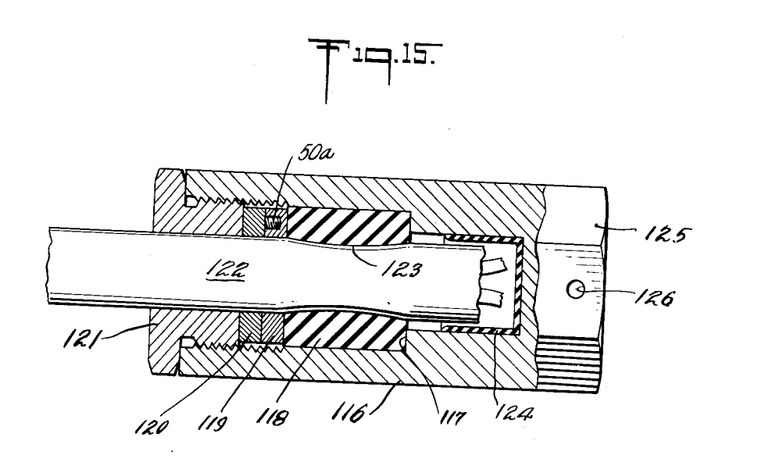
FIG. 15 is a sectional plan of a sealing device for capping a cut end of a cable.

It sometimes happens than an electric cable in the sea must be disconnected from an instrument temporarily while the instrument is being repaired or modified, and this invention is useful in protecting the free cable end, at such times, from penetration by sea water. This is illustrated in FIG. 15 wherein a hollow casing 116 open at one end and closed at the other has an internal shoulder 117 facing the open end. A premolded grommet 118 similar to grommet 11 of FIG. 1 seats against the shoulder and a rigid washer 119 that abuts the outer end face of the grommet confines the latter against the shoulder 117. A resilient or split washer 120 abuts against the outer face of washer 119 and is confined thereagainst by bushing 121 which is threaded into the open end of the cavity in the casing and compresses the grommet, the rigid washer and the spring or split washer against the shoulder 117 with substantial pressure that deforms the grommet sidewise into tight contact with the cable 122, and in fact indents the grommet somewhat into the cable periphery as shown by the line 123. The closed end of the cavity on the end and along the contiguous part of the side wall is lined with insulating material 124 so that the exposed ends of the wires of the cable cannot engage with the metallic casing and be connected together as a "short" thereby. If the casing is made of insulating material the lining 124 is unnecessary. To apply the casing to a cable, the bushing 121, the rigid washer, the spring or split washer and the grommet are removed and slid over the free end of the cable 122. The free end is then inserted as shown in FIG. 15, and the grommet, rigid washer, spring or split washer, and the bushing 121 are replaced in that order and the bushing 121 then tightened to effect the seal over the free end of the cable. The closed end of the casing and the flange on the bushing are made hexagonal as at 125, so that the casing and bushing may be gripped by wrenches and one may firmly thread the bushing into the open end of the casing. An aperture 126 in the closed end enables one to attach a wire or cord thereto and through it prevent its being carried away from the casing and lost.

In FIGS. 1, 1a, 2, 4, 5 and 15, the washers 12, 28, 70, 89 and 119 respectively may be bonded to the grommets they abut, and provided with threaded recesses 50a in which the end of a threaded rod may be threaded to facilitate its removal, as explained in connection with FIG. 3.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. A packing construction for use in sealing an electric flexible cable of the type having a bundle of individual conductors disposed side by side and encased in a somewhat deformable insulation sheath of uniform diameter against fluid leakage along it where it is of substantially uniform diameter as it passes through an opening in a wall at the opposite sides of which different fluid pressures exist, which comprises a tubular member to be secured in and closing said opening with a fluid tight coupling thereto and having a passage therethrough from end to end through which said cable may extend, said member having one end portion of said passage enlarged to provide an annular shoulder at the junction between the enlarged portion with the remainder of the passage, the unenlarged portion of said passage approximately fitting any electric cable passing through said member, a sleeve of elastic and substantially incompressible but deformable sealing material disposed in said passage at said one end, abutting endwise against said shoulder, and having a passage lengthwise therethrough and through which said cable may pass, with said sleeve approximately fitting said cable, a relatively rigid ring in said passage and confining said sleeve against said shoulder, a spring washer also in said passage and confining said ring against said sleeve, a tubular stuffing gland attached to said member at said enlarged end of said passage for adjustment thereon in the direction of length of said passage and having an end part within and extending along said enlarged end of said passage of said member to press said washer, ring and sleeve together and the latter against said shoulder as the gland is adjusted toward said shoulder to deform said sleeve into tight sealing engagement with said cable, whereby with an electric cable passing end to end through said passage of said member, sleeve, ring, spring washer and gland, an adjustment of said gland along said passage of said member toward said shoulder will press said sleeve endwise of itself against said shoulder to have sealing contact therewith and also deform it laterally into sealing contact with the periphery of said passage and with the periphery of said cable passing through said member, with said spring washer then under stress to provide a resilient, continuing pressure on said sleeve to keep it in sealing contact with said shoulder, said passage and the periphery of said electric cable, during variation in temperature around said member and cable in use, the wall of said passage of said member at a side of said shoulder opposite from said sleeve having a cavity therein into which the periphery of said cable may expand when the cable is pushed endwise in a direction to expand its diameter and form a lug resisting further endwise movement of the cable along said passage.

2. A packing construction for use in sealing an electric flexible cable of the type having a bundle of individual conductors disposed side by side and encased in a somewhat deformable insulation sheath of uniform diameter against fluid leakage along it where it is of substantially uniform diameter as it passes through an opening in a wall at the opposite sides of which different fluid pressures exist, which comprises a tubular member to be secured in and closing said opening with a fluid tight coupling thereto and having a passage therethrough from end to end through which said cable may extend, said member having one end portion of said passage enlarged to provide an annular shoulder at the junction between the enlarged portion with the remainder of the passage, the unenlarged portion of said passage approximately fitting any electric cable passing through said member, a sleeve of elastic and substantially incompressible but deformable sealing material disposed in said passage at said one end, abutting endwise against said shoulder, and having a passage lengthwise therethrough and through which said cable may pass, with said sleeve approximately fitting said cable, a relatively rigid ring in said passage and confining said sleeve against said shoulder, a spring washer also in said passage and confining said ring against said sleeve, a tubular stuffing gland attached to said member at said enlarged end of said passage for adjustment thereon in the direction of length of said passage and having an end part within and extending along said enlarged end of said passage of said member to press said washer, ring and sleeve together and the latter against said shoulder as the gland is adjusted toward said shoulder to deform said sleeve into tight sealing engagement with said cable, whereby with an electric cable passing end to end through said passage of said member, sleeve, ring, spring washer and gland, an adjustment of said gland along said passage of said member toward said shoulder will press said sleeve endwise of itself against said shoulder to have sealing contact therewith and also deform it laterally into sealing contact with the periphery of said passage and with the periphery of said cable passing through said member, with said spring washer then under stress to provide a resilient, continuing pressure on said sleeve to keep it in sealing contact with said shoulder, said passage and the periphery of said electric cable, during variation in temperature around said member and cable in use, the cooperating shoulder, sleeve, ring, washer and gland to form the seal to the cable being provided at both ends of said tubular member and the wall of the passage of said tubular member between said shoulders having a cavity into which may expand the periphery of said cable when the cable is pushed endwise in either direction, to lock the cable against endwise movement through said member under endwise pushing forces on said cable in either endwise direction.

3. A packing construction for use in sealing an electric flexible cable of the type having a bundle of individual conductors disposed side by side and encased in a somewhat deformable insulation sheath of uniform diameter against fluid leakage along it where it is of substantially uniform diameter as it passes through an opening in a wall at the opposite sides of which different fluid pressures exist, which comprises a tubular member to be secured in and closing said opening with a fluid tight coupling thereto and having a passage therethrough from end to end through which cable may extend, said member having one end portion of said passage enlarged to provide an annular shoulder at the junction between the enlarged portion with the remainder of the passage, the unenlarged portion of said passage approximately fitting any electric cable passing through said member, a sleeve of elastic and substantially incompressible but deformable sealing material disposed in said passage at said one end, abutting endwise against said shoulder, and having a passage lengthwise therethrough and through which said cable may pass, with said sleeve approximately fitting said cable, a relatively rigid ring in said passage and confining said sleeve against said shoulder, a spring washer also in said passage and confining said ring against said sleeve, a tubular stuffing gland attached to said member at said enlarged end of said passage for adjustment thereon in the direction of length of said passage and having an end part within and extending along said enlarged end of said passage of said member to press said washer, ring and sleeve together and the latter against said shoulder as the gland is adjusted toward said shoulder to deform said sleeve into tight sealing engagement with said cable, whereby with an electric cable passing end to end through said passage of said member, sleeve, ring, spring washer and gland, an adjustment of said gland along said passage of said member toward said shoulder will press said sleeve endwise of itself against said shoulder to have sealing contact therewith and also deform it laterally into sealing contact with the periphery of said passage and with the periphery of said cable passing through said member, with said spring washer then under stress to provide a resilient, continuing pressure on said sleeve to keep it in sealing contact with said shoulder, said passage and the periphery of said electric cable, during variation in temperature around said member and cable in use, said tubular member having two internal shoulders spaced apart along the length of its passage from one end, a separate sealing construction of sleeve, rigid ring, spring washer and gland cooperating with each shoulder but arranged in tandem along said tubular member, and a rigid ring disposed against the shoulder nearest that end of said passage against which abuts the inner end of the outermost sleeve.

4. The construction as set forth in claim 3, wherein said glands are threaded into said passage and the outer end face of the innermost stuffing gland is provided with spaced recesses to receive a tool by which it may be adjusted by turning to compress endwise the innermost of said sleeves.

5. A packing construction for sealing an electric cable of the type having a bundle of individual conductors disposed side by side and encased in a somewhat deformable insulation sheath of uniform diameter to a tubular member through which it passes to prevent leakage of a fluid under a pressure differential along the cable, which comprises said member having a passage from end to end therethrough through which said electric cable may extend, said member having one end portion of said passage enlarged to provide an internal shoulder in said passage facing the open end of said enlarged portion of said passage, said unenlarged portion of said passage approximately fitting the exterior periphery of an electric cable passing through said member along said passage, a tubular element of elastic and substantially incompressible but deformable sealing material disposed in the enlarged portion of said passage, abutting endwise against said shoulder, and through the passage of which said electric cable may extend, a rigid ring in said enlarged portion of said passage of said member and abutting the outer end of said element, a spring washer in said enlarged portion of said passage and abutting the outer end face of said rigid ring, and a tubular gland secured to said member at the open end of the enlarged portion of said passage, and adjustable on the same in a direction parallel to the axis of said member passage, said gland having an end within and extending along the enlarged portion of said passage and operable upon inward adjustment of said gland on the spring washer to press it and thereby press said element against said shoulder and expand it sidewise into sealing contact with the wall of said member passage and with the periphery of an electric cable passing through it, with said spring washer then under stress to provide a resilient, continuing expanding pressure on said element that maintains the sealing contact of said element with the member passage and said cable under temperature variations to which the member and cable may be subjected in use, said tubular gland having a portion engaging with said member to limit its inward adjustment and thereby apply a known pressure on said elastic element, depending on the selected lengths of said tubular element and gland, the passage in said member having such a sealing construction at each end, and in the portion of such passage between the shoulders of said sealing arrangements, a cavity in its wall into which the periphery of said cable which crosses it may be displaced upon endwise pushing of either end of the cable into the member, to form a lug that by its engagement with the cavity wall opposes further pushing of the cable endwise into the member.

6. A construction for sealing the passage in a wall of a hollow member along which extends an electric cable of the type having a bundle of individual conductors disposed side by side and encased in a somewhat deformable insulation sheath of uniform diameter, which comprises said member having said passage with an open end, and within the passage and spaced well from said open end a shoulder facing toward said open end, a tubular grommet of elastic, substantially incompressible but deformable material disposed in said passage and limited in movement in one direction along said passage by said shoulder, a rigid apertured plate in said passage and slidable along it and abutting against the outer end face of said grommet, a tubular gland adjustable in a direction lengthwise along said passage in its said open end, and a resilient, compressible, apertured interponent disposed within said passage of said member between said plate and the inner end of said gland, the apertures and passages of said plate, grommet, interponent and gland being aligned and of a size to pass therethrough and approximately fit the periphery of a cable, whereby when an electric cable is disposed in said passage and passing through said gland, interponent, plate and grommet, and the gland is moved in said passage towards said shoulder and into tight pressing engagement with said interponent it will press the grommet endwise and thereby expand it sidewise into tight sealing contact with the periphery of said cable, with said interponent under a predetermined stress to exert a continuing endwise pressure on said grommet and maintain said sealing contact under variations in temperature of said sealing construction, said gland at its outer end extending well away from said member and having a slot therein from one side of a width at least as wide as the passage through the gland and extending across that gland passage, and a knife having a shape and size to fit and move along said slot with a cutting edge on its advancing edge, whereby in an emergency said knife can be inserted in said slot and forced across said passage to sever the cable and seal the gland passage.

7. The construction as set forth in claim 6 and locking means on the outer end of said gland and selectively operable to lock the knife in said cable severed position.

8. A construction for sealing the passage in a wall of a hollow member along which extends an electric cable of the type having a bundle of individual conductors disposed side by side and encased in a somewhat deformable insulation sheath of uniform diameter, which comprises said member having said passage with an open end, and within the passage and spaced well from said open end a shoulder facing toward said open end, a tubular grommet of elastic, substantially incompressible but deformable material disposed in said passage and limited in movement in one direction along said passage by said shoulder, a rigid apertured plate in said passage and slidable along it and abutting against the outer end face of said grommet, a tubular gland adjustable in a direction lengthwise along said passage in its said open end, and a resilient, compressible, apertured interponent disposed within said passage of said member between said plate and the inner end of said gland, the apertures and passages of said plate, grommet, interponent and gland being aligned and of a size to pass therethrough and approximately fit the periphery of a cable, whereby when an electric cable is disposed in said passage and passes through said gland, interponent, plate and grommet, and the gland is moved in said passage towards said shoulder and into tight pressing engagement with said interponent, it will press the grommet endwise and thereby expand it sidewise into tight sealing contact with the periphery of said cable, with said interponent under a predetermined stress to exert a continuing endwise pressure on said grommet and maintain said sealing contact under variations in temperature of said sealing construction, said member passage, inwardly beyond said shoulder, having a recess in its wall into which the cable may expand and form a lug when the cable is pushed endwise in said passage while it is in sealing engagement with said grommet.

9. A construction for sealing a passage in a wall of a shell around an electric cable of the type having a bundle of individual conductors disposed side by side and encased in a somewhat deformable insulation sheath of uniform diameter and which may enter the shell through said passage, which comprises said shell with said passage with a portion that approximately fits said cable and an enlarged portion forming with the unenlarged portion an abutment spaced well from the entrance in said wall of said passage, a tubular grommet of elastic, substantially incompressible but deformable material in the enlarged portion of said passage, engaged against said abutment, and having an axial passage of a size to pass and approximately fit the periphery of said electric cable, a plate in said passage abutting the outer end of said grommet and having an aperture of approximately the diameter of said cable, aligned with the axial passage in said grommet, resilient, compressible means in said passage abutting said plate, and means mounted in this entrance portion of said passage for adjustment into said passage to variable extents, for engaging at its inner end against said plate to press the latter toward said abutment, and having a part engageable with said shell to limit its extent of adjustment into said recess to that which will result in a predetermined and selected resilient pressure on said grommet that will deform the latter sidewise into firm contact with the peripheral wall of said passage and indent itself into the periphery of the sheath of any cable that may pass through said gland, said means, said plate and said grommet, and seal the cable against leakage along it, the unenlarged portion of said passage wall inwardly from said passage entrance beyond said abutment being of a size to approximately fit said cable and having a depression into which such cable may expand when pushed endwise toward the opening to said recess.

References Cited in the file of this patent

UNITED STATES PATENTS

| 1,479,656 | Fetterley | Jan. 1, 1924 |
| 2,268,263 | Newell et al. | Dec. 30, 1941 |
| 2,361,215 | Lamberger et al. | Oct. 24, 1944 |
| 2,431,120 | Howe | Nov. 18, 1947 |
| 2,651,672 | Ivanoff | Sept. 8, 1953 |
| 2,716,672 | Stevens | Aug. 30, 1955 |

FOREIGN PATENTS

| 850,004 | France | Aug. 28, 1939 |
| 271,228 | Switzerland | Jan. 3, 1951 |
| 808,658 | Germany | July 16, 1951 |
| 1,104,475 | France | June 15, 1955 |
| 780,993 | Great Britain | Aug. 14, 1957 |